May 18, 1926.
J. W. PHELPS
ELECTRIC FLASHER
Filed May 24, 1924    4 Sheets-Sheet 1
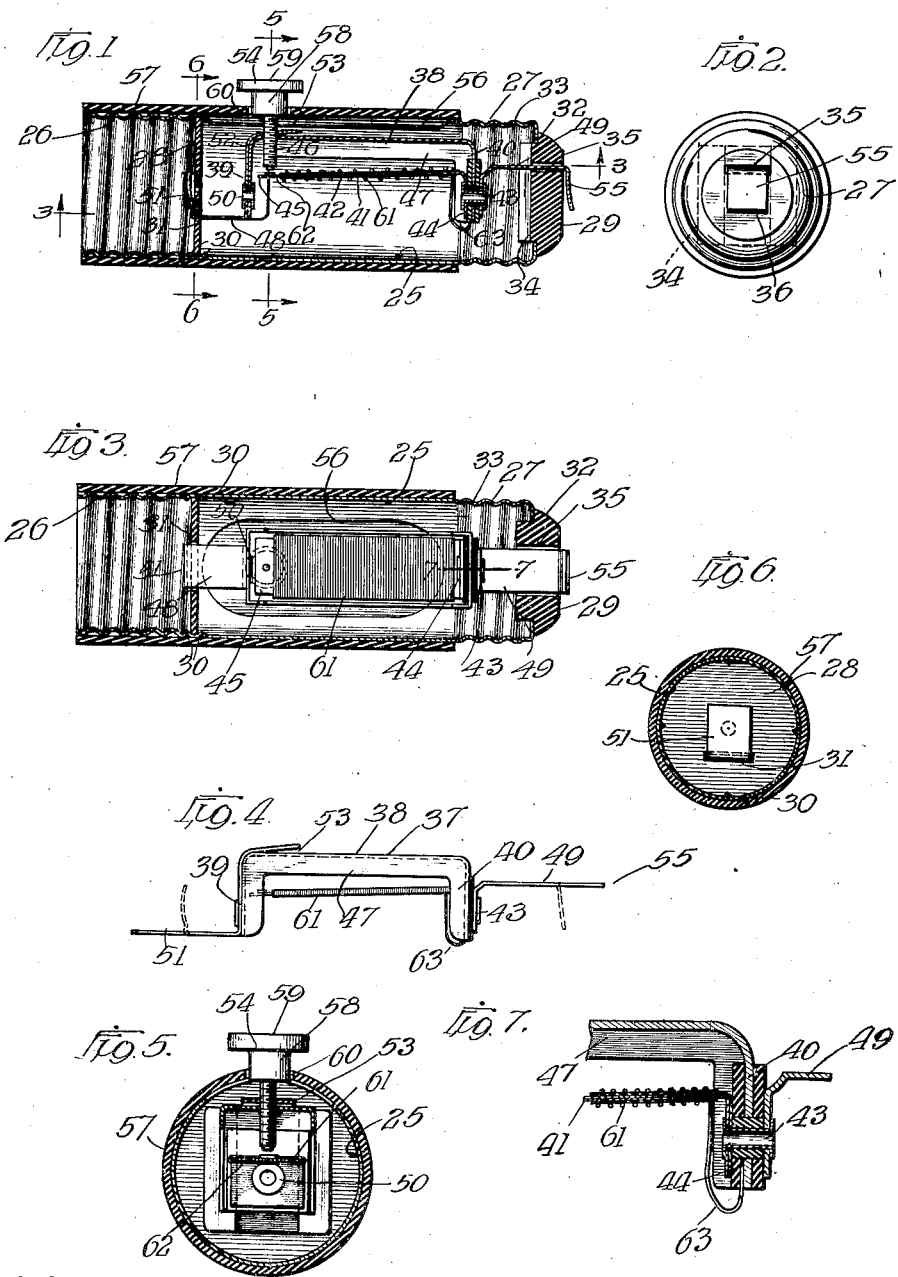

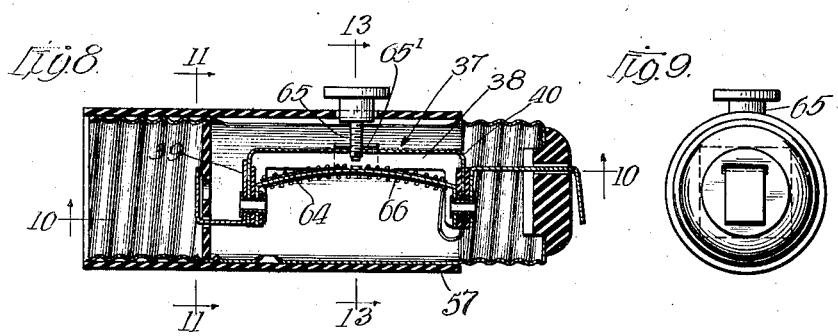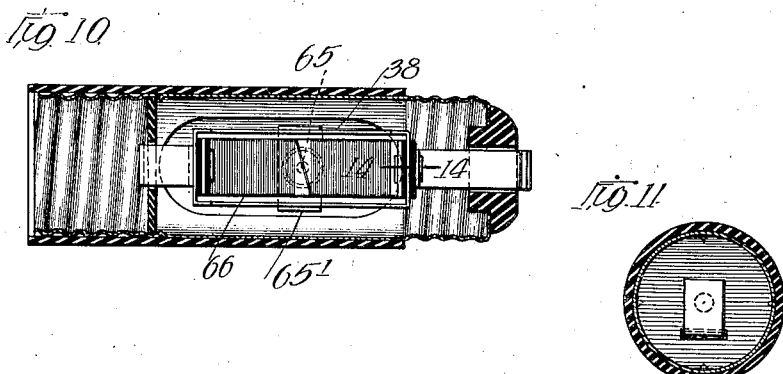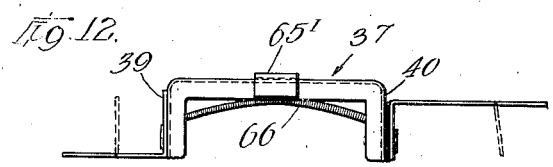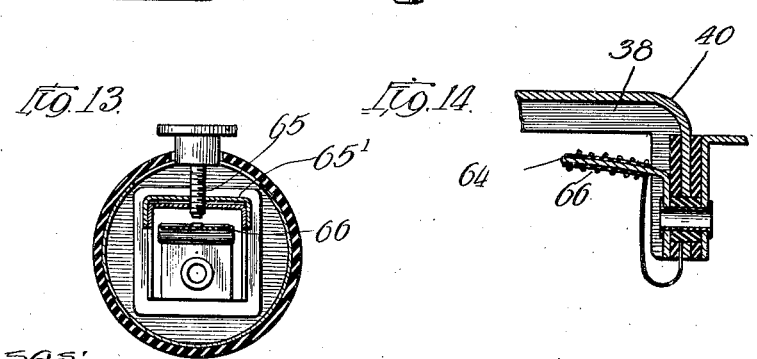

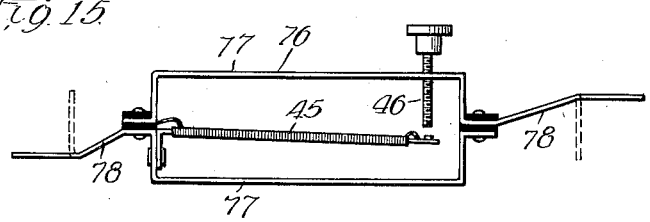
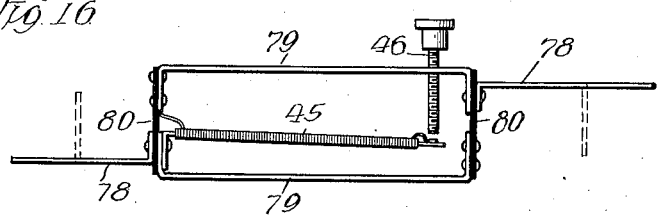
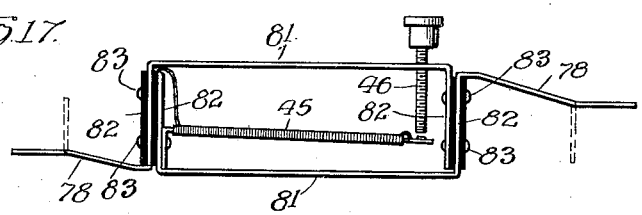
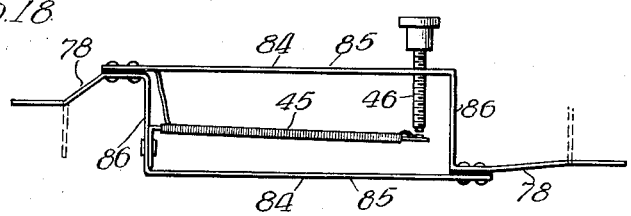
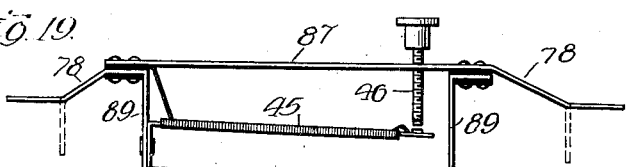

May 18, 1926.

J. W. PHELPS 1,584,892

ELECTRIC FLASHER

Filed May 24, 1924

Witnesses:
Harry C. White
W. P. Kilroy

Inventor
James W. Phelps
By Edward Fay Wilson Atty.

Patented May 18, 1926.

1,584,892

UNITED STATES PATENT OFFICE.

JAMES W. PHELPS, OF CHICAGO, ILLINOIS.

ELECTRIC FLASHER.

Application filed May 24, 1924. Serial No. 715,554.

My invention relates to improvements in automatic electric flashers or cutouts, and has special reference to improvements in the construction of the interior mechanism and its mounting in the outer shell.

A particular object of my invention is to provide a form of interior mechanism in the form of a unitary mechanism, which shall include suitable flat contacts at each end adapted to form the center terminal of a socket connection at one end and a plug connection at the opposite end, and which when completed will serve to hold the interior mechanism firmly in place within the protecting shell.

By means of my invention I have greatly reduced construction and number of parts involved in the construction of such devices, which are somewhat similar to the thermostatic cutout disclosed in my earlier Patent No. 1,476,022 granted December 4, 1923.

My invention will be more readily understood by reference to the accompanying drawings forming part of this specification and in which:

Figure 1, is longitudinal central sectional view of a flashing device made in accordance with my invention;

Figure 2, is an end elevation of the right hand end of Figure 1;

Figure 3, is a longitudinal sectional view on the line 3—3 of Figure 1;

Figure 4, is a side elevation of the interior mechanism of the device as it appears before it is assembled with the other parts;

Figure 20:
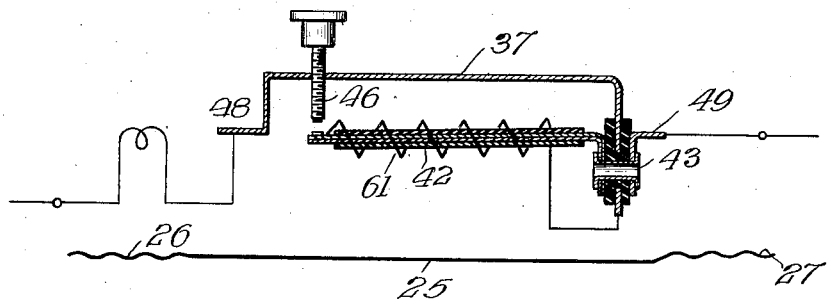
Figure 22:
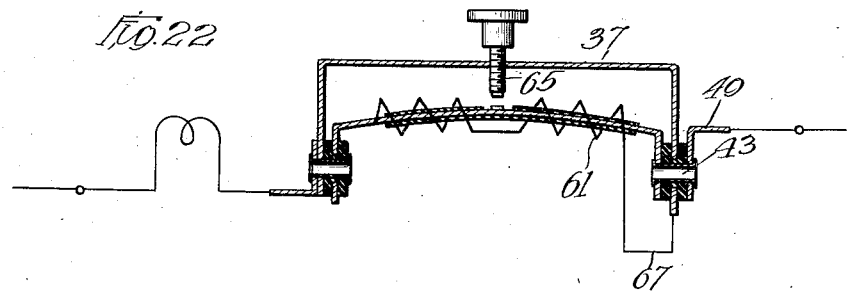
Figure 21:
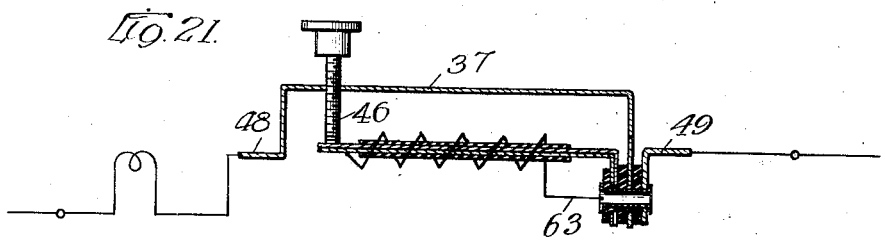

Figures 5 and 6 are transverse sections on the line 5—5 and 6—6, respectively, of Figure 1;

Figure 7, is an enlarged fragmentary sectional view on the line 7—7 of Figure 3;

Figure 8, is a view similar to Figure 1 showing a different form of electric thermostat;

Figure 9, is a right hand end view of the device shown in Figure 8;

Figure 10, is a longitudinal section on the line 10—10 of Figure 8;

Figure 11, is a transverse section on the line 11—11 of Figure 8;

Figure 12, is a side elevation of the interior mechanism shown in Figure 8 before it is assembled with the other parts;

Figure 13, is a transverse section on the line 13—13 of Figure 8;

Figure 14, is an enlarged fragmentary section on the line 14—14 of Figure 10;

Figures 15 to 19, inclusive, are views similar to Figures 4 and 12, and showing various modified constructions of the interior mechanism;

Figure 20, is an electric circuit diagram showing the thermostatic coil conected in shunt;

Figure 21, is a similar diagram showing the coil connected in series;

Figure 22, is a similar diagram showing a bowed single metal thermoelement; and

Figure 23:
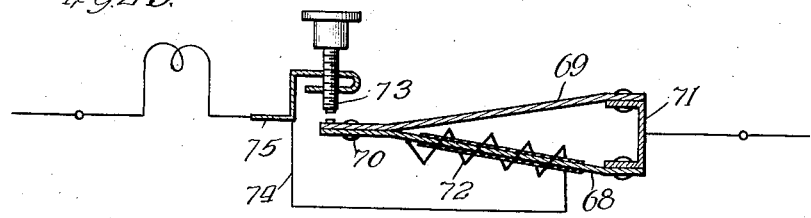

Figure 23, is a similar diagram showing a single metal double arm thermoelement.

In said drawings, 25 is a tubular casing formed into a screw socket 26 at one end and a screw plug 27 at the opposite end. The socket and plug are standard, adapting the device to be inserted in circuit between a lamp and its socket. The casing is adapted to contain an electric thermocircuit breaker and is provided with a transverse wall 28 of insulation material, such as hard fibre or the like, which forms the bottom of the socket 26, and with a head 29 at its opposite end which forms the outer end of the plug end of the device. The head 29 is preferably made of porcelain or the like.

The disk which forms the wall 28 fits tightly within the tubular casing and is held permanently assembled therewith by indentations 30 made in the wall of the casing at each side of the disk. The disk 28 is provided with a slot 31 through which a connection strip is adapted to project from the interior of the casing to form the center contact for the socket 26.

The head 29 is provided with an exterior shoulder or flange 32 for contact with an inturned flange 33 on the plug 27 for properly positioning the head. The head is also provided with a rectangular base or inner portion 34, which fits within a similar shaped opening in the flange 33, whereby the head 29 is retained against rotation. This head is also provided with a slot 35 through which a contact strip can be projected to form the center contact 36 for the plug end of the device.

A particular feature of my invention relates to a unitary construction of the interior mechanism of the device ready for mounting within the casing and the elimination of a body member therefor of insulation material, the interior mechanism being adapted to be held in properly insulated condition by the heads 28 and 29. The interior mechanism comprises a metal frame or main body member 37 formed of a shallow U-shape, that is, having a relatively long center part 38 and relatively short arms 39 and 40 at its end extending out at one side and substantially parallel with each other. Within this member, that is, between the bent ends 39 and 40, I arrange an electric thermostatic circuit controller 41 adapted to, open and close the lamp circuit and cause the lamp to flash.

The controller 41, illustrated in Figure 1, consists of a bi-metallic strip 42 extending longitudinally and secured at one end to the arm 40, preferably by a tubular rivet 43. The bent end 44 of the strip 42 is insulated from the arm 40 by suitable insulation washers surrounding the rivet 43. The free end 45 of the strip 42 extends close to the other arm 39, and there is provided an adjustable contact screw 46 mounted in the part 38 of the frame 37, the point of which is adapted at times to contact with the free end of the bi-metallic strip 42. For the purpose of making the frame 37 relatively rigid, it is provided with narrow edge flanges 47 which extend around on both ends 39 and 40. For mounting the frame 37 within the casing and for providing center contacts for the two ends of the device, I provide a contact strip 48 at the socket end and a similar contact strip 49 at the plug end. The contact strip 48 is secured to the arm 39 by a hollow rivet 50 and, before being assembled into position, its free end 51 extends out endwise from the frame 37 in position to be projected through the slot 31 provided in the head 30, as the frame 37 is entered into the casing from the opposite end. After being entered into position the free end 51 is bent down against the outer surface of the head 30 to form the center contact for the socket 26. The opposite end 52 of the strip 48 extends along the outer surface of the arm 39, and its extreme end 53 is bent over substantially parallel with and spaced slightly from the back of the part 38 of the frame 37. This free end 53 is provided with a threaded opening to receive the adjustable screw 46, as is also the part 38. The screw 46 is threaded through both of these holes, and the slight inaccuracies of manufacture provides friction sufficient on the screw to retain it in its adjusted position. But if the screw should not be held with sufficient friction, a slight springing out of the end 53 will affect the registration of the threads of the two holes and produce friction on the screw. Preferably the screw is provided with a head 54 of insulation material to permit its adjustment while the current is on without danger of shock. The contact strip 49 at the opposite end is clamped to the frame 37 by the hollow rivet 43 and, like the other contact strip, extends straight out until assembled into position. After the frame has been placed in the casing the insulation head 29 is strung on to the strip 49, and when the square base 34 is properly positioned in the opening in the end 33, the free end 55 is bent down over the outer end of the head 29 to form the center contact of the plug end of the device. The inner mechanism is so formed or shaped that when mounted within the case, as described, the body portion is held in spaced relation from the casing and is insulated therefrom by the heads 29 and 30 by which it is held. To ensure the spacing of the frame from the casing adjacent to the part 38 the casing is cut away at one side, as shown at 56. For covering and protecting the outer surface of the casing 25, I provide a tubular shell 57 of insulation material, such as fibre or the like. This shell extends from the outer end of the socket 26 to the base end of the plug 27, and is dowelled in place by the screw head 54, which is preferably provided with a cylindrical dowelling part 58 of smaller diameter than the finger grip part 59 of the head. This dowelling part 58 fits freely in a hole 60 in the shell 57.

To complete the electric thermostatic element, I wind an insulated coil of fine wire 61 on the bimetallic strip 42 and I connect the coil, so that at times the current passes through same and heats the strip 42 which, on account of being made of two metals of different coefficients of expansion, is made to change its shape and cause its free end to swing one way or the other. I arrange the form shown in Figure 1, so that the free end 45 of the strip normally stands free of the adjusting screw 46, and so that when the strip is heated it swings over into contact with the screw. One end of the coil 61 is soldered to the free end of the strip at 62, and the other end 63 is connected to the frame 37, preferably by being clamped against the arm 40 of the frame by the rivet 43. In Figure 20, I have shown an electric diagram of the device connected in this manner and which is known as a shunt connection or coil. In this form and manner of connection the current enters through the center connection 49 of the plug end of the device, thence through the hollow rivet 43 to the bi-metallic strip 42, thence through the heating coil 61 to the frame 37, thence through the contact 48 to the lamp or other current using device, thence through the shell 25, back to the plug 27. Sufficient current passes to heat the bi-metallic member and cause it to swing over into contact with the adjusting screw. When this occurs the current passes directly to the frame 37, thus cutting out the heating coil, the bi-metallic member then cools off and again opens the circuit between the screw 46 and the thermo bar 42, and the action, as described, is repeated. By adjusting the screw 46 in and out the periodicity of the flashes can be readily altered.

In Figure 21, I have shown the same construction, as already described, except that the heating coil is connected in series instead of in shunt. In this arrangement the end 63 of the coil is connected directly to the contact 49, so that the current passes directly from the contact 49 through the coil and then to the frame 37, through the screw 46 and then to the current using device, such as a lamp, through the contact 48. In this form the circuit is closed between the bi-metallic bar and the screw 46 until the bar is heated by the coil; it then swings away from the screw and opens the circuit.

In Figures 8 to 14, inclusive, I have shown a form of thermostatic device wherein the thermo bar is made of a single metal instead of two metals as heretofore described. In this form the idea of the unit construction of the interior mechanism is preserved and it is similarly mounted in the tubular casing. The thermoelement in this form, comprising a longitudinally curved strut bar 64 is secured at its ends to the two ends 39 and 40 of the frame 37, the bar being humped up or curved up toward the part 38 of the frame 37. When this bar is heated it is lengthened and as the arms hold it against spreading its ends apart the middle portion is forced out towards the frame part 38. I arrange an adjustable screw 65 at the middle portion of the frame 37 and projecting toward the member 64 and in position to be contacted by same when the member 64 is heated to a predetermined point by the coil 66 wound on same. In the drawings I have illustrated the heating coil as connected in shunt, which is the preferred method of connecting it.

As in the form already described, means are provided to keep the adjusting screw 65 from changing its adjusted position. This comprises a U-shaped bridge member 65' secured on the frame part 37 and having a threaded opening in register with the opening in the frame part 37 for receiving the screw 65. The bridge member is raised slightly from the frame part 37, so that there can be produced the desired inaccuracy in the two aligned thread openings to provide the desired holding friction on the adjustable screw 65. This shunt form of connecting the coil is identical with that already described in relation to Figure 20, and is diagrammatically illustrated in Figure 22, wherein the end 67 of the coil 61 is shown as connected to the frame 37 by the rivet 43, so that the current passes through the device in the same way as shown in Figure 20.

There is still another form of thermostatic device which I sometimes use, and this is illustrated in the diagram, Figure 23. In this form the metal part which is heated and cooled, comprises two bars 68 and 69, brought close together and connected at one end, as shown at 70, and spread apart at their opposite ends and rigidly connected by a rigid connector 71. I wind an insulated coil 72 around one only of said bars 68 and 69, so that this leg can be heated to a higher temperature than the other, thus causing the connected ends 70 to swing back and forth. The contact screw 73 is arranged in relation to the end 70, so that the circuit can be closed and opened by the swinging of the end 70. In this form the free end 74 of the heating coil is connected directly to the contact 75, which leads to the current using device, and the screw 73 is also mounted on this contact strip 75. This illustrates the shunt type of connection for this form of thermo-device.

While I have thus far described a framework, comprising a rigid U-shaped main part for enclosing the thermoelement, it will be obvious that many other forms of frame can be devised, and in Figures 15 to 19, inclusive, I have illustrated some of these many forms. The forms of the frames shown in Figures 15 to 19 are all of the complete rectangular form, as distinguished from those already described, which have one open side and are rendered rigid enough for the purpose by the turned over stiffening flanges. The central main frame part 76 is made up of two substantially duplicate half rectangles 77 adapted to be secured together at their ends to form a box-like rectangle. Each of these parts has an extension 78 on one end, and these are arranged projecting in opposite directions to form the center contacts at the two ends. These extensions are first formed projecting straight out in position to be projected through the slots in the heads of the device, and then they are bent over, as hereinbefore described, for holding this inner current carrying unit in place in the casing. In each of the forms shown in Figures 15 to 19, I have shown the simple form of thermostat, first shown in Figure 1, and with the heating coil shunt wound. It should be understood that in these modified forms of construction the parts are properly insulated from each other to cause the desired flow of current.

In Figure 16, I have shown a form of frame quite similar to that shown in Figure 15, except that instead of the ends of the two parts 79 of the frame being secured directly together, they are joined by end pieces or plates 80 made of insulation material, and the end connections 78 are short pieces secured to the ends of the frame.

In Figure 17, the main central frame is made up of two U-shaped frames 81, the ends 82 of which are long enough to overlap and be joined by two rivets 83. In this form also the end connections 78 are extensions of the side members 81, similar to the form shown in Figure 15.

In Figure 18, each part 84 of the central frame comprises a side longitudinal part 85 and an end part 86 at one end extending clear across the end of the frame and bent at its extreme end to lie parallel with the side members, the two parts being connected at the diagonally opposite corners of the frame. As in the form shown in Figure 15, the end connections 78 are extensions of the frame parts.

In Figure 19, one of the frame parts 87 is a straight piece and the other 88 is bent to U-form to form ends 89 long enough to span the frame and be secured to the ends of the straight piece. In this form also the end connections 78 are extensions of the main frame parts.

It will now be understood that regardless of the particular form the frame part may take, the idea is consistently carried out of making the device of an outer shell and an inner unitary current controlling member and the two assembled together by means of the two insulation heads or ends. All of the small assembly work, except the securing of the heads, is confined to the one unitary structure. This tends to simplification of manufacturing operations and reduction of the labor and cost, and this is particularly useful on account of the very large quantities of these devices which are now being sold and used.

As many changes in and modifications of my invention will be readily suggested to one skilled in the art, I do not limit or confine my invention to the specific details of construction herein shown and described, except within the scope of the appended claims.

I claim:

1. In a device of the kind described, a metallic tubular casing formed, to provide a socket shell at one end and a plug shell at the other end, a head of insulation material secured in the casing to form the bottom of the socket, a head of insulation material adapted to be received in the plug end of the casing, and a unitary mechanism including an automatic circuit make and break device, provided with contact strips at its ends for mounting on said heads, holding the plug head in place and forming the center contacts of the socket and the plug.

2. In a device of the kind described, a unitary current carrying structure, having a metallic frame, and provided with contact strips extending from opposite ends, said structure including an automatically operable make and break device, and the whole adapted to be mounted in a casing and held separated from the casing by said contact strips, which are adapted to form the center contacts at each end of the device.

3. In a device of the kind described, a rigid built up metal frame, housing an electro thermostatic make and break device, the frame having contact strips extending from opposite ends thereof adapted to support the frame in a tubular casing.

4. In a device of the kind described, a unitary mechanism including a metal frame, a thermostat housed within the frame, contact strips extending from the ends of the frame, a tubular metal casing for housing said mechanism, heads of insulation material in the casing, the heads provided with openings for receiving said contact strips, and a tube of insulation material for covering the casing.

5. In a device of the kind described, a unitary mechanism including a metal frame, a thermostat housed within the frame, contact strips extending from the ends of the frame, a tubular metal casing for housing said mechanism, heads of insulation material in the casing, the heads provided with openings for receiving said contact strips, a tube of insulation material for covering the casing, and an adjusting screw for the thermostat, the tubular cover having an opening through which said screw passes and by which the cover is dowelled upon the casing.

6. In a device of the kind described, a unitary mechanism including a metal frame, a thermostat housed within the frame, contact strips extending from the ends of the frame, a tubular metal casing for housing said mechanism, heads of insulation material in the casing, the heads provided with openings for receiving said contact strips, a tube of insulation material for covering the casing, and an adjusting screw for the thermostat extending out through the casing and cover and provided with a head of insulation material dowelled in the cover.

7. In a flashing device for interposition between a lamp and a lamp socket, comprising a tubular metal casing presenting at one end a plug and at the other end a socket, an interior mechanism including an electric thermostatic device mounted on a rigid metal frame and contact strips extending from opposite ends of the frame, and heads of insulation material having slots for receiving said strips and mounting said mechanism in the casing, the ends of said strips being adapted to be bent over to hold the parts of the flashing device together and to form the center contacts at each end.

8. In a flashing device of the kind described, a metal casing, independent heads of insulation material in the casing, and a unitary interior mechanism held by the heads spaced from the casing, said mechanism including a thermoelectric circuit opener and closer.

9. In a device of the kind described, a rigid frame, an electro-thermostatic make and break device housed within the frame, and contact strips extending from the ends of the frame for mounting it in a suitable casing.

10. In a device of the kind described, a metal casing, independent heads of insulation material spaced apart in the casing, a unitary continuous metallic mechanism held by the heads, free from the casing, said heads held against separation by said mechanism, and said mechanism including a thermoelectric circuit opener and closer.

11. In a device of the character described, a supporting structure providing spaced apart heads of insulation material, a unitary metallic structure, including a thermoelectric responsive make and break element arranged between said heads, the metallic structure having bendable strips extending from its ends and through said heads, and their outer ends adapted to be bent to lie substantially parallel with and adjacent to the outer surfaces of said heads.

12. In a device of the character described, a supporting structure providing spaced apart ends of insulation material, a unitary metallic structure, including a thermoelectric responsive make and break element arranged between said ends, bendable strips extending from the ends of the metallic structure, the free end portions of said strips adapted to be bent down substantially parallel to said ends of the insulation material to retain the metallic structure in position.

13. In a device of the character described, a supporting structure providing spaced apart ends of insulation material, a thermoelectric make and break mechanism arranged between said ends, bendable contact strips extending from the make and break mechanism through said ends, and the outer ends of said strips adapted to be bent to form center contacts on said ends.

14. In a device of the character described, a supporting structure providing spaced apart ends of insulation material, a thermoelectric make and break mechanism arranged between said ends, bendable contact strips extending from the ends of said mechanism, said ends of insulation material having slots through which the strips pass, and the outer ends of said strips adapted to form contacts adjacent to the outer surfaces of said ends.

In testimony whereof, I have hereunto set my hand, this 7th day of May, 1924.

JAMES W. PHELPS.